US005113199A

United States Patent [19]

Chan et al.

[11] Patent Number: 5,113,199

[45] Date of Patent: May 12, 1992

[54] INK DELIVERY SYSTEM FOR INK JET PRINTERS

[75] Inventors: C. S. Chan, Boise, Id.; Alfred I. Pan, Sunnyvale, Calif.

[73] Assignee: Hewlett-Packard Company, Palo Alto, Calif.

[21] Appl. No.: 667,710

[22] Filed: Mar. 11, 1991

[51] Int. Cl.[5] .......... G01D 15/16

[52] U.S. Cl. .......... 346/1.1; 346/140 R

[58] Field of Search .......... 346/1.1, 75, 140 R

[56] References Cited

U.S. PATENT DOCUMENTS 4,575,738 3/1986 Sheufelt et al. .......... 346/140 R

*Primary Examiner*—Benjamin R. Fuller
*Assistant Examiner*—Gerald E. Preston

[57] ABSTRACT

A system for delivering ink to print heads in thermal ink jet printers includes a liquid compartment with a gas space thereabove at sub-atmospheric pressure, a hydrophobic membrane mounted between the liquid compartment and the surrounding environment for allowing ambient gases to bubble into the liquid while preventing liquid from flowing in the opposite direction through the membrane, at least one chamber that provides a reservoir of ink with a gas space thereabove at sub-atmospheric pressure, and a manifold connecting the gas space in the liquid compartment with the gas space in the ink chamber. Thermal ink jet print heads are mounted in ink-flow communication with the ink chamber and are adapted for ejecting ink onto sheets to be printed. In operation, ink flows into the thermal ink jet print heads at a flow rate which is regulated by a generally constant back pressure. This novel pen body construction enables the hydrophobic membrane to be completely isolated from the ink in the multiple ink reservoirs of the pen, with the advantage that ingredients and additives within the ink do not degrade the surface properties of the hydrophobic membrane material.

26 Claims, 1 Drawing Sheet

INK DELIVERY SYSTEM FOR INK JET PRINTERS

TECHNICAL FIELD

This invention relates generally to pen body construction for thermal ink jet (TIJ) pens and more particularly to such construction which simultaneously enhances both the ink storage capability and the regulation of back pressure within the pen.

BACKGROUND ART AND RELATED APPLICATIONS

In the fields of both monochromatic and color ink jet printing using, for example, thermal ink jet printers of the type operative with disposable TIJ pens, various approaches have been taken to ensure that these pens were constructed to have a reasonably large ink storage capacity in order to give these pens a commercially acceptable lifetime. It has been a common practice to construct these pens so that a thin film resistor (TFR) type of printhead device could be mounted on or adjacent to one surface of the pen body housing and an ink storage compartment arranged within the housing and in ink flow communication with the thin film resistor printhead. However, in addition to providing an adequate ink storage capacity for these disposable ink jet pens, it is also a requirement that a controlled negative pressure or back pressure be maintained at the output ink ejection orifice plate of the thin film resistor printhead. This is done in order to ensure that ink does not drool or drip from the printhead with insufficient back pressure or does not deprime by the use of too much back pressure generated within the ink storage compartment.

In U.S. Pat. No. 4,500,895 issued to Roy T. Buck et al and assigned to the present assignee, there is disclosed a disposable thermal ink jet pen which utilizes a collapsible bladder as the ink storage compartment for the pen. This bladder has been constructed to collapse gradually during ink depletion therein, and it operates to provide a range of relatively constant back pressures as the pen is depleted from full to empty. However, as a result of the non-linearity in the back pressure versus ink depletion characteristic of the pen, these pens are hard to scale up to larger pen body constructions in such a manner that the back pressure maintained by the bladder is substantially constant and closely controlled.

Another approach to maintaining and improving the control over the necessary constant back pressure at the thin film resistor printhead of a thermal ink jet pen has been to use a reticulated polyurethane foam in either the black or color storage compartments of the pen. This type of foam material has served quite satisfactorily to not only maintain the necessary constant back pressure in the pen, but also to prevent the ink from sloshing around within the pen body housing during its rapid back and forth movement in a pen carriage member of a thermal ink jet printer. One such approach using a foam material as the ink storage medium is disclosed and claimed in U.S. Pat. No. 4,771,295 issued to Jeffrey P. Baker et al and also assigned to the present assignee.

In order to provide yet another approach to maintaining good control over the back pressure at the printhead of a thermal ink jet pen while simultaneously increasing its ink storage capacity, we have discovered and developed a novel alternative pen body construction which uses, among other things, a thin hydrophobic membrane which is positioned between an ink storage reservoir and an air space within an ink receiving compartment of the pen. A thin film resistor printhead is mounted adjacent to an output surface of the ink receiving compartment and operates to draw ink from the main ink reservoir into the ink receiving compartment when the differential pressure across the thin hydrophobic membrane exceeds the inherent bubble pressure of the membrane. This novel pen body construction is disclosed and claimed in our co-pending application Ser. No. 07/414,893 of Alfred I. Pan and C. S. Chan entitled "Ink Delivery System For Printers", also assigned to the present assignee and incorporated herein by reference.

DISCLOSURE OF INVENTION

The general purpose and principal object of the present invention is to provide yet still another novel and elegant approach to thermal ink jet pen body construction and an alternative construction with respect to the ink delivery system disclosed and claimed in our above identified co-pending application Ser. No. 07/414,893. That is to say, the present invention represents still further new and useful improvements in the art and technology of thermal ink jet printing and represents a novel variation and alternative to ink delivery system disclosed and claimed in our above identified co-pending application.

Another object of this invention is to provide a new and improved thermal ink jet pen body construction of the type described which operates to maintain excellent control over back pressure regulation within the pen while simultaneously eliminating exposure of the back pressure regulating element within the pen to contaminants such as ink dyes and other additives within the ink compartment of the pen.

A novel feature of this invention is the provision of a single back pressure regulating element which is used to control the back pressure in one or a plurality of ink containing compartments within the pen body housing. This single negative back pressure regulating element is isolated from these ink containing compartments by an inert liquid such as deionized water or diethylglycol, DEG, to thereby maintain the back pressure regulating element isolated from the above contaminants. Simultaneously, this novel construction enables a single back pressure regulating element to control the negative back pressures in all of a plurality of black and color ink compartments in a multi-compartment thermal ink jet pen.

The above purpose, objects, novel features and related advantages are achieved herein by the provision of, among other things, an ink delivery system for regulating the back pressure above a free ink surface of a volume of ink in one or a plurality of compartments of an ink jet pen of the type having an ink jet printhead mounted in ink flow communication with the above volumes of ink. The system includes a back pressure regulating element, such as a thin hydrophobic membrane which is mounted between a liquid surface within the pen body housing and an adjacent air space on the outside of the housing and is responsive to a differential change in pressure thereacross which is produced by ink being ejected from the ink jet printhead. This increase in differential pressure is thus operative to cause air to pass from outside the housing and through the pressure regulating element and into the one or more ink containing compartments within the pen body housing. This action in turn reduces the back pressure above the free liquid surface in each of the compartments until an equilibrium condition is again established at the pressure regulating element so that air no longer flows therethrough.

In the preferred embodiment described herein, the ink delivery system of the present invention includes:

a. liquid compartment means with a gas space thereabove at sub-atmospheric pressure;

b. hydrophobic membrane means mounted between the liquid compartment means and the surrounding environment for allowing ambient gases to bubble into liquid in the liquid compartment while preventing liquid from flowing in the opposite direction through the membrane means;

c. at least one chamber that provides a reservoir of ink with a gas space thereabove at sub-atmospheric pressure;

d. manifold means connecting the gas space in the liquid compartment means with the gas space in the ink chamber means; and e. thermal ink jet print head means mounted in ink-flow communication with the ink chamber means and adapted for ejecting ink onto sheets to be printed, which ink flows into the thermal ink jet print heads from the ink chamber at a flow rate regulated by a generally constant back pressure.

Further in the preferred embodiment, the ink delivery system of the present invention includes a plurality of ink chambers, each of which is associated with a separate print head, thereby providing multi-color printing when each of the ink chambers contains ink of a different color. Still further in the preferred embodiment, the hydrophobic membrane is constructed of a non-wettable polymer material. In typical practice, the non-wettable polymer material is porous with pore diameters less than about one-hundred microns, and usually ranging between about five microns and about twenty microns.

BRIEF DESCRIPTION OF THE DRAWINGS

The present invention can be further understood with reference to the following description in conjunction with the appended drawings, wherein like elements are provided with the same reference numerals.

DETAILED DESCRIPTION OF THE PREFERRED EMBODIMENT

Figure 1:
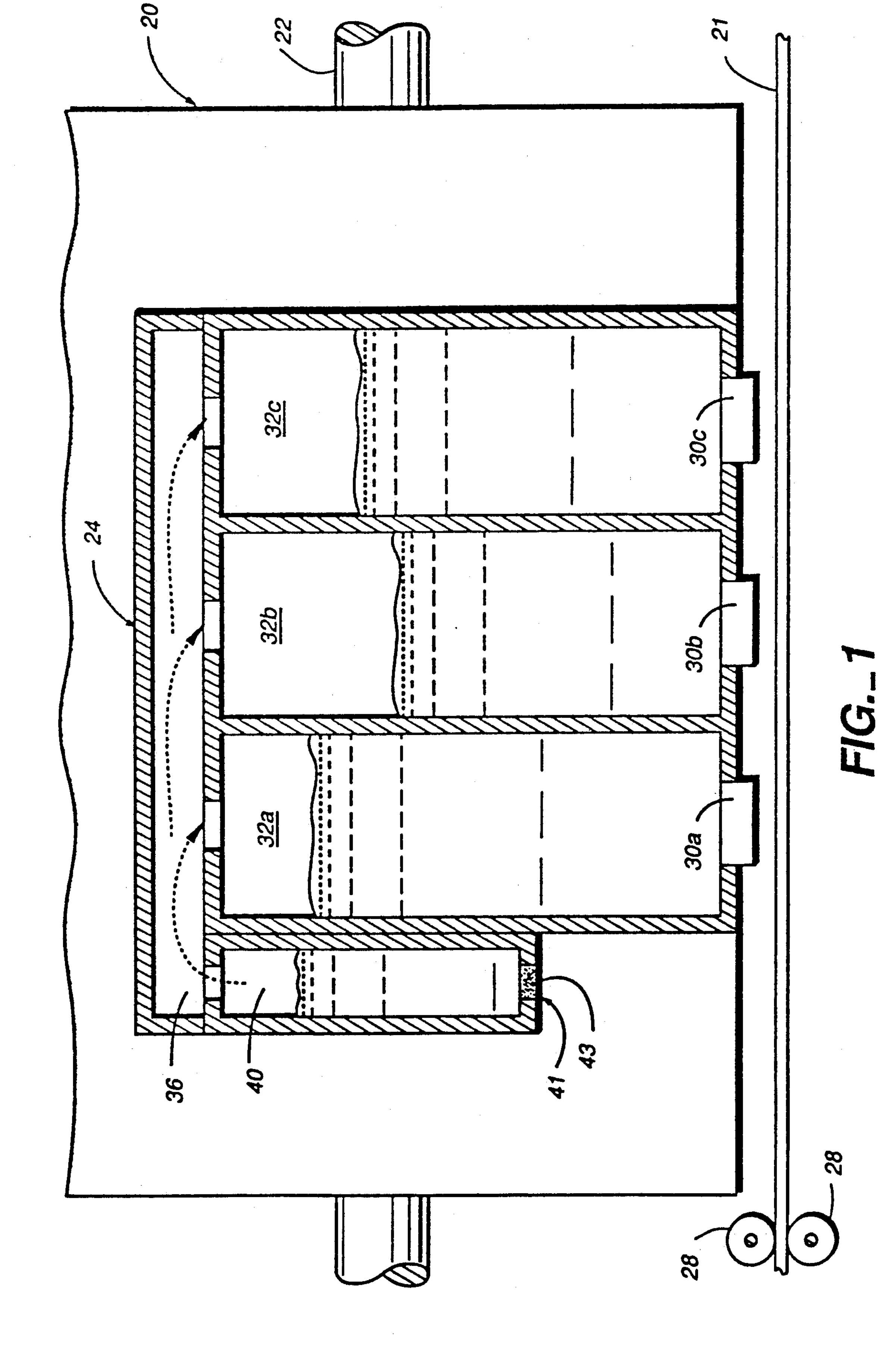
FIG. 1 is a cross-sectional view of an ink jet printing mechanism according to the present invention.

Generally speaking, FIG. 1 shows an ink jet pen carriage 20 that carries an ink jet pen 24 for printing sheets 21. In the illustrated embodiment, the carriage 20 is driven to slide on a guide shaft 22, thereby moving the ink jet pen 24 back and forth parallel to the sheets 21. It should be understood that a suitable motor, not shown, is connected for driving the carriage 20 along the guide shaft 22. Rollers 28 are provided for feeding individual sheets beneath ink jet pen 24.

As further shown in FIG. 1, the ink jet pen 24 includes a plurality of ink jet printing elements, or "printing heads", generally designated by the numbers 30*a*, 30*b*, and 30*c*. Still further, the ink jet pen 24 includes a plurality of ink supply chambers 32*a*, 32*b*, and 32*c* that provide reservoirs of ink for delivery to the respective printing heads 30*a*, 30*b*, and 30*c*. In practice, the ink supply chambers 32*a*, 32*b*, and 32*c* are mounted side-by-side and each of the chambers contains ink of a different color. (Accordingly, the illustrated system provides three-color printing.) The size and shape of the individual ink supply chambers 32*a*, 32*b*, and 32*c* is a matter of design choice.

The printing heads 30*a*, 30*b*, and 30*c* are of conventional design, and for that reason are not described in detail herein. Such printing elements are commercially available from various sources, including the Hewlett Packard Company of Palo Alto, Ca.

As also shown in FIG. 1, the ink supply chambers 32*a*, 32*b*, and 32*c* are all connected in gas-flow communication to a common manifold 36 that, in turn, is in gas-flow communication with a compartment 40. The compartment 40 is adapted to contain a column of liquid, such as deionized water or diethylglycol, DEG. The lower portion of the compartment 40 includes an aperture 41 across which is sealed a membrane 43 such that any air entering compartment 40 must pass through the membrane. As will be explained below, the hydrophobic membrane 43 assists in regulating the ink flow rate to the printing elements 30*a*, 30*b*, and 30*c* at a generally constant back pressure.

Preferably, the membrane 43 is constructed of non-wettable (i.e., hydrophobic) polymer material. Examples of suitable hydrophobic polymers include Teflon TM with pore diameters ranging between about ten microns to about twenty microns, and Nylon TM mesh having pore diameters ranging from about five microns to about twenty microns. A more recently developed hydrophobic material sold under the tradename Goretex TM may also be used in the fabrication of the hydrophobic membrane 43. Such membrane materials, because of their hydrophobic nature, allow air to flow across the membrane into the pressure regulating compartment 40 while preventing liquid from flowing in the opposite direction across the membrane; that is, the membrane 43 operates as a one-way valve with respect to air flow. The pore size of the membrane 43 is one of the factors in determining the back pressure which is established at the printhead of the pen, and it should be small enough to prevent liquid from flowing through the membrane. Ordinarily, a pore diameter less than about one-hundred microns is sufficient for that purpose. The particular surface properties of the membrane 43 will also have an effect on the back pressure within the pen.

When an air bubble passes through the hydrophobic membrane 43, it will continue to travel up through the water and out of the free liquid surface thereof only when the bubble diameter reaches a certain size. It can be shown that if the radius of a bubble is defined as $r_b$, then the bubble will not leave the water-membrane interface if the differential pressure across the bubble, delta P, is less than $2\tau/r_b$ where $\tau$ is defined as the surface tension of the liquid, and a delta P is also defined as the pressure differential existing between the atmospheric pressure outside the membrane 3 minus the pressure head, h, of the liquid minus the pressure in the plenum or space above the liquid surface in the pressure regulating compartment.

However, when a single small bubble begins to ingest air and grow larger or when two or more small bubbles at the membrane-liquid interface coalesce into a larger bubble to thereby increase the value of $r_b$ so that delta P becomes greater than $2\tau/r_b$, then the air bubble will lift up to the free liquid surface in the pressure regulating compartment. Using a water-like liquid having a surface tension of about 50–70 dynes per centimeter and a head, h. of five (5) inches of $H_2O$, air bubbles will propagate to the free liquid surface in the pressure regulating compartment when the air bubble radius, $r_b$, exceeds about 69 micrometers. However, the above proportionality between delta P and $2\tau/r_b$ is independent of the obtuse contact angle that the bubble makes with the pore walls of the hydrophobic membrane 43 only if the bubble is spherical, which was assumed for purposes of making the above calculation.

The operation of the ink jet pen 24 of FIG. 1 will now be described. Initially, it should be understood that sub-atmospheric pressure (i.e., negative pressure) is established in the spaces above the ink levels in supply chambers 32*a*, 32*b*, and 32*c*. Then, with the manifold 36 establishing gas-flow communication between the supply chambers and the compartment 40, a negative pressure is also established above the liquid level in the supply chambers 32*a*, 32*b*, and 32*c*.

With the above-described initial conditions having been established, the printing heads 30*a*, 30*b*, and 30*c* can be selectively operated to eject ink. Upon ejection of ink from any one of the heads, the ink volume is decreased in a corresponding one of the ink-supply chambers 32*a*, 32*b*, and 32*c*. This decrease in ink volume, in turn, increases the negative pressure in the spaces above the ink-supply chambers. Then, because the manifold 36 establishes gas-flow communication between the ink supply chambers and the compartment 40, the increased negative pressure in the ink-supply chambers causes an increase in the fluid pressure differential across the membrane 43. When the point is reached at which the pressure differential across the membrane 43 exceeds the membrane's inherent bubble pressure, air is drawn into the compartment 40 from the surrounding environment. The air bubbles through the liquid in the compartment 42 until the negative pressure within the ink jet pen 24 is changed sufficiently to reduce the pressure differential across membrane 43 to a value which is less than the membrane's bubble pressure. Accordingly, the ink delivery system described and claimed herein is self-regulating and provides a substantially constant back pressure within the ink-containing compartments of the pen body housing regardless of the quantity of ink ejected from the print heads 30*a*, 30*b*, and 30*c*. Also, individual back pressure control means are not needed for each of the ink supply chambers, and this latter benefit is especially important with multi-color printing.

In practice, negative pressure is initially established within the ink jet pen 24 by ejecting ink drops from any one of the printing elements 30*a*, 30*b*, and 30*c*. If desired, the housing of the ink jet pen 24 may be made transparent to permit the ink volume to be visually detected. However, the present invention is applicable equally to transparent and non-transparent pen body housings.

Thus, in contrast to the requirement in our co-pending application Ser. No. 07/414,893 that a pressure regulating hydrophobic membrane element be used in each of the ink containing compartments therein and be directly exposed therein to contaminants such as ink dyes or other additives within the ink, the novel alternative construction of the present invention enables the pen 24 to be manufactured using a single pressure regulating element 43. This element is mounted within the lower portion of the single pressure regulating compartment 40 at the aperture 41 therein and thus is isolated by the inert liquid, such as deionized water or diethylglycol, which is used in the compartment 40 as a means for establishing a differential bubble pressure across the membrane 43. Thus, whereas the operation of the ink delivery system in our above identified co-pending application is such that the hydrophobic membrane therein passes liquid into an adjacent ink receiving compartment to maintain a substantially constant back pressure in each associated ink receiving compartment, the operation of the hydrophobic membrane 43 in accordance with the present invention operates to pass air bubbles, rather than ink, into the regions 32*a*, 32*b*, and 32*c* above the ink free surfaces of the bodies of ink in each of these three compartments. These air bubbles pass through the openings in the top walls of these three compartments as indicated by the three dotted arrows within the open area 36 of the manifold 24.

Accordingly, the ability to isolate the membrane 43 from the above described contaminants results in maintaining the integrity of the surface properties of the membrane for a long time and preventing them from being lost or degraded after being exposed for some time to contaminants in the ink. This feature in turn improves the back pressure regulation capability of the thin hydrophobic membrane pressure regulating element and thus enables a single pressure regulating element 43 and associated liquid compartment to control the level of negative back pressures in all of a plurality of adjacent ink containing compartments 32*a*, 32*b*, and 32*c*.

Equally important, however, is the fact that the above described novel pen body construction allows the use of a much wider variety of different types of inks without having to worry about whether or not some known or unknown additive or ingredient within the ink chemistry is going to have an adverse effect on the surface properties of the hydrophobic member 34 to the detriment of its back pressure regulation function.

The principles, preferred embodiments and modes of operation of the present invention have been described in the foregoing specification. However, the invention which is intended to be protected should not be construed as limited to the particular embodiments disclosed. That is, the embodiment described herein is to be regarded as illustrative rather than restrictive. Variations and changes may be made by others without departing from the spirit and scope of the present invention. Accordingly, it is expressly intended that all such variations and changes are within the scope of the following appended claims.

We claim:

1. A system for delivering ink to print heads in thermal ink jet printers, comprising:

a. compartment means for holding liquid with a gas space thereabove at sub-atmospheric pressure;
b. hydrophobic membrane means mounted in communication between the liquid in the compartment means and surrounding environment for allowing ambient gases to bubble into the liquid while preventing liquid from flowing in an opposite direction through the membrane means;
c. at least one chamber means for providing a reservoir of ink with a gas space above the ink reservoir at sub-atmospheric pressure;
d. manifold means connecting the gas space of the compartment means in gas-flow communication with gas spaces in the at least one chamber means; and e. ink jet print head means mounted in ink-flow communication with the at least one chamber means, the print head means being adapted for ejecting ink onto sheets to be printed.

2. A system according to claim 1 wherein the chamber means comprises a plurality of chamber means, each of which is adapted to hold ink for printing.

3. A system according to claim 2 wherein the chamber means comprises a plurality of chambers that are mounted side-by-side.

4. A system according to claim 3 wherein the chamber means each contain ink of a different color.

5. A system according to claim 1 wherein the lower portion of said compartment means includes an aperture across which is sealed the hydrophobic membrane means such that any air entering compartment means must pass through the hydrophobic membrane means.

6. A system according to claim 5 wherein the hydrophobic membrane means assists in regulating ink flow rate to the thermal ink jet print head means at a generally constant back pressure.

7. A system according to claim 5 wherein the hydrophobic membrane means is constructed of non-wettable polymer material.

8. A system according to claim 7 wherein the hydrophobic membrane means is selected from the group consisting of Teflon TM, Nylon TM, and Goretex TM.

9. A system according to claim 7 wherein the hydrophobic membrane means comprises Nylon TM mesh having pore diameters ranging from about five microns to about twenty microns.

10. A system according to claim 7 wherein the hydrophobic membrane means is porous with pore diameters ranging between about five microns to about twenty microns.

11. A system according to claim 7 wherein the hydrophobic membrane means allow air to flow into the compartment means while preventing liquid from flowing in the opposite direction.

12. A system according to claim 11 wherein the hydrophobic membrane means is porous with pore diameters less than about one-hundred microns.

13. A system for delivering ink to print heads in thermal ink jet printers, comprising:

a. compartment means for holding liquid with a gas space thereabove at sub-atmospheric pressure;

b. hydrophobic membrane means mounted below the liquid in the compartment means for allowing ambient gases to bubble into the liquid while preventing liquid from flowing in opposite direction through the membrane means;

c. a plurality of chamber means for providing reservoirs of ink with gas spaces above the ink reservoirs that are at sub-atmospheric pressure;

d. thermal ink jet print head means mounted in ink-flow communication with each of the chamber means for ejecting ink onto sheets to be printed; and e. manifold means connecting the gas space of the compartment means in gas-flow communication with the gas spaces in the chamber means so that ink flow into the thermal ink jet print head means from respective ones of the chamber means at a flow rate that is regulated by substantially constant back pressure.

14. A system according to claim 13 wherein the plurality of chamber means are mounted side-by-side for each containing ink of a different color.

15. A system according to claim 13 wherein the lower portion of compartment means includes an aperture across which is sealed the hydrophobic membrane means.

16. A system according to claim 13 wherein the hydrophobic membrane means is constructed of non-wettable polymer material.

17. A system according to claim 16 wherein the non-wettable polymer material is porous with pore diameters ranging between about five microns to about twenty microns.

18. A system according to claim 17 wherein the non-wettable polymer material is porous with pore diameters less than about one-hundred microns.

19. A method for regulating back pressure above a free ink surface of a volume of ink within an ink compartment of an ink jet pen having an ink jet printhead mounted in ink flow communication with said volume of ink and being operative to increase negative pressure above said free ink surface upon ejection of ink from said printhead onto an adjacent printed media, characterized by the step of: passing air unidirectionally into said ink compartment when said negative pressure above said free ink surface therein exceeds a predetermined value, whereby the regulation of the negative pressure at said free ink surface within said ink compartment enhances the uniformity of ink drop volumes ejected from said ink jet printhead and thereby optimizes print quality on said adjacent printed media.

20. The method defined in claim 19 wherein said unidirectional passing of air into said ink compartment is accomplished by:

a. providing a suitable liquid volume between said free ink surface within said compartment and a thin hydrophobic membrane, and b. developing a differential pressure across said thin hydrophobic membrane which reaches a value sufficient to pull air unidirectionally through said membrane when said negative pressure above said free ink surface exceeds said predetermined value.

21. A system for regulating back pressure above a free ink surface of a volume of ink in an ink compartment of an ink jet pen having an ink jet printhead mounted in ink flow communication with said volume of ink and being operative to increase negative pressure above said free ink surface during ejection of ink from said printhead onto a print media, which comprises means for passing air unidirectionally into said ink compartment when said negative pressure above said free ink surface exceeds a predetermined value, whereby the regulation of the negative pressure at said free ink surface enhances uniformity of ink drop volumes ejected from said ink jet printhead and thereby optimizes print quality on an adjacent printed media.

22. The system defined in claim 21 wherein said means for passing air unidirectionally into said ink compartment comprises liquid volume containment means positioned between said free ink surface and a thin hydrophobic membrane, whereby the increase of said negative pressure above said free ink surface to exceed said predetermined value in turn develops a differential pressure across said thin hydrophobic membrane which reaches a value sufficient to pull air unidirectionally through said thin hydrophobic membrane and thereby pass air bubbles through said liquid containment means and into said ink compartment until such time that the negative pressure above said free ink surface therein is reduced to an equilibrium value insufficient to pull further air bubbles through said thin hydrophobic membrane.

23. A system for regulating back pressure above a free ink surface of a volume of ink in one or a plurality of ink compartments of an ink jet pen having an ink jet printhead mounted in ink flow communication with said volume of ink in each of said one or a plurality of ink containing compartments, said system including a thin pressure regulating element disposed between a body of liquid and an adjacent air space and being operative in response to ink on demand from said ink jet printhead to maintain the back pressure above said free ink surface in each of said one or a plurality of ink containing compartments at a substantially constant value.

24. The system defined in claim 23 wherein said pressure regulating element is mounted within a single pressure regulation compartment located adjacent to said one or a plurality of ink containing compartments and being operative to pass air bubbles up through a liquid within said pressure regulation compartment to thereby reduce negative back pressure above said free ink surface of a volume of ink in said one or a plurality of ink containing compartments.

25. The system defined in claim 24 wherein said liquid in said pressure regulating compartment is an inert fluid including de-ionized water or diethylglycol, DEG.

26. The system defined in claim 25 wherein said pressure regulating element is a thin hydrophobic membrane having a predetermined pore size sufficient to establish a predetermined inherent differential bubble pressure across opposing surfaces of said membrane and being operative to pass air bubbles unidirectionally through said membrane and into said inert fluid when the differential pressure across said membrane exceeds its said inherent bubble pressure.

* * * * *